Figure 1:
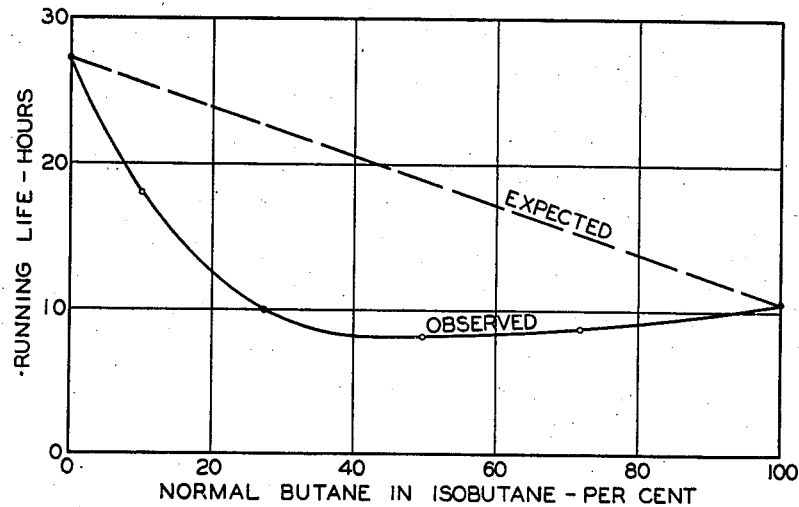

June 6, 1944.   M. P. MATUSZAK   2,350,628
CATALYTIC DEHYDROGENATION PROCESS
Filed Nov. 22, 1940

INVENTOR
MARYAN P. MATUSZAK
BY
ATTORNEY

Patented June 6, 1944

2,350,628

UNITED STATES PATENT OFFICE 2,350,628

CATALYTIC DEHYDROGENATION PROCESS

Maryan P. Matuszak, Bartlesville, Okla., assignor to Phillips Petroleum Company, a corporation of Delaware Application November 22, 1940, Serial No. 366,773

5 Claims. (Cl. 260—683.3)

This invention relates to an improved process of catalytically dehydrogenating mixtures of hydrocarbons, particularly mixtures containing at least two paraffin hydrocarbons having at least two carbon atoms per molecule. More particularly it relates to the dehydrogenation of hydrocarbon mixtures containing isomeric hydrocarbons.

Catalytic dehydrogenation of paraffin hydrocarbons is known. For example, Frey and Huppke in U. S. Patents 1,905,383 and 2,098,959 disclosed catalytic dehydrogenation of hydrocarbons with the aid of chromium oxide-containing catalysts. Other suitable and/or improved chromium oxide-containing catalysts effective for the dehydrogenation of hydrocarbons have been disclosed in the following copending applications: Morey, Serial No. 113,091, filed November 27, 1936; Matuszak and Morey, Serial No. 173,708, filed November 9, 1937; Morey and Frey, Serial No. 173,709, filed November 9, 1937; Morey, Serial No. 359,295, filed October 1, 1940; Morey and Frey, Serial No. 359,296, filed October 1, 1940; Blaker, Serial No. 365,369, filed November 12, 1940. These catalysts generally contain unglowed chromium oxide obtained by nonspontaneous thermal treatment of chromium compounds such as hydrated chromic oxide, ammonium salts of chromic acid, and the like. Other suitable dehydrogenation catalysts, such as alumina and bauxite, with or without promoters such as compounds of chromium, zirconium, molybdenum, etc., may be used. Bauxite as a catalyst for the dehydrogenation of hydrocarbons has been disclosed in the patent of Schulze, 2,167,602.

Catalytic dehydrogenation of hydrocarbon mixtures is subject to considerable difficulty that hitherto has been inexplicable, such as the production of yields far below those expected on the basis of results obtained with catalysts of known high activity for the dehydrogenation of pure individual hydrocarbons. For example, a catalyst of known high productivity for the dehydrogenation of isobutane and of normal butane, individually, would appear incapable of effecting sustained dehydrogenation of a mixture of these two hydrocarbons for a reasonably long period; instead of effecting a profitable degree of dehydrogenation for a period of 60 hours, for example, it would do so for only a period perhaps 20 hours. The unexpected decrease in the productivity of the catalyst appeared to indicate the presence of a poison of some kind in the feed stock, but efforts to identify the poison and to effect its removal were not successful.

In the past, a generally accepted assumption has been that during catalytic dehydrogenation each component of a mixture behaves independently as a separate individual without affecting the dehydrogenation of any other component except in so far as its presence influences the concentrations and thus shifts the thermodynamically possible equilibrium. Thus, in the catalytic dehydrogenation of a mixture of normal butane and isobutane, the presence of one butane has been assumed not to affect the dehydrogenation of the other except in so far as its concentration is decreased. Similarly, in the case of other mixtures, such as gasoline, the individual components thereof have been assumed to exert no untoward or deleterious influence upon the catalytic dehydrogenation of one another. Thus, in general, for any mixture containing two or more paraffin hydrocarbons, catalytic dehydrogenation has been tacitly held to proceed for each hydrocarbon independently of the presence of the others, aside from concentration effects to be expected from theoretical or thermodynamical considerations.

I have discovered that, unexpectedly and contrary to the foregoing assumption, the composition of the feed stock with respect to the relative amounts of hydrocarbons contained therein is of great influence upon the ability of a catalyst to effect sustained dehydrogenation, when the feed stock is a mixture of two or more hydrocarbons. This discovery may be explained most simply with the aid of a specific example, such as the catalytic dehydrogenation of mixtures of the two butanes. In runs relating to this purely illustrative specific example, a gel catalyst comprising black unglowed chromium oxide was used, and various mixtures made up of chemically pure normal butane and chemically pure isobutane were dehydrogenated. The two chemically pure butanes contained no detectable impurities except 0.002 per cent of sulphur, which was shown by other runs to be negligible in so far as any poisoning effect on the catalyst was concerned. For each run a fresh 5-cc. portion of one and the same batch of catalyst was placed in a heat-resistant glass tube, which was mounted vertically in an electric resistance furnace. The catalyst was heated gradually to a temperature of about 842° F. in an atmosphere of hydrogen. Then the feed stock, consisting of isobutane, or of normal butane, or of known mixtures of both, was passed downwardly through the catalyst at atmospheric pressure and at a flow rate of 10 liters per hour. The temperature of the catalyst was adjusted automatically to maintain a constant conversion of 17 per cent of the feed stock into butenes. When the temperature reached 1004° F. the run was stopped, and the running life of the catalyst, or the duration of the run, was noted. In all runs the time of contact of the hydrocarbon feed stock with the catalyst was the same. The results of these runs are shown graphically in Figure 1 of the accompanying drawing.

Figure 1 shows that with pure isobutane a run of 27 hours was obtained and that with pure normal butane a run of 11 hours was obtained. On the basis of the knowledge and assumptions of the prior art, then, the running life for a mixture of the two butanes should be at least 11 hours, and it should exceed 11 hours by an additional period of from 0 to 16 hours, in proportion to the percentage of isobutane in the mixture. In other words, the running life of the catalyst for various mixtures should fall along the broken straight line in Figure 1 joining the two points for the individual butanes.

This expected result was not obtained. Instead, the data of the several runs made with mixtures defined a curve with a minimum for an approximately equimolecular mixture of the two butanes. The minimum running life found was 8 hours, which is 27 per cent less than the 11 hours obtained with normal butane alone. To one side of this minimum, the results show that the presence of normal butane in isobutane leads to an important, very pronounced, and more or less proportional decrease in the running life of the catalyst. On the other side of the minimum, the results show that the presence of isobutane in normal butane leads to a similar more or less proportional, although somewhat less pronounced, decrease in the running life. In the region of the minimum, or for approximately equimolecular mixtures of the two butanes, the running life observed, 8 hours, was only about 42 per cent of the expected value of about 19 hours. For a considerable range of mixtures, including those containing from about 20 to 65 per cent normal butane, or from 35 to 80 per cent isobutane, the observed running life was half or less than half of the expected value. Within this range, the mixture giving rise to the maximum unexpected decrease in running life is shown by inspection of the figure to be that containing 32 per cent normal butane and 68 per cent isobutane; for this mixture, the decrease indicated by the figure is 13 hours, which is 59 per cent of the expected life of 22 hours. For mixtures outside of this range of 20 to 65 per cent normal butane, the decrease in running life is less than half of the expected running life, but it is still quite large. For example, a mixture of 10 per cent normal butane and 90 per cent isobutane gave a run of only 18 hours instead of the expected value of about 26 hours; the difference of 8 hours constitutes a decrease of almost 31 per cent. Even so little as 5 per cent normal butane in isobutane is shown by the figure to lead to a heretofore unexpected decrease of 16 per cent in the running life.

The foregoing data illustrate the undesirably low productivity obtained in the catalytic dehydrogenation of four-carbon paraffin mixtures by the prior art, especially when the dehydrogenation is carried out under such constant conversion conditions. Similarly, undesirably unfavorable results are obtained for many other mixtures containing two or more paraffin hydrocarbons and for catalysts other than those containing chromium oxide, such as alumina, zirconia, and the like. In general, the more complex the hydrocarbon mixture, the greater is the undesirable loss in productivity, although no simple rule has been found to apply to all cases. Such undesirable loss of productivity constitutes a defect in the prior art of catalytic dehydrogenation of hydrocarbon mixtures.

This defect is more serious than is indicated by the foregoing data when recycling of unconverted hydrocarbons back to the process is practiced. Since the various components in the mixture generally are dehydrogenated by one and the same catalyst at different rates, the recycle stock contains more of the relatively refractory components than the original feed stock; thus the material in contact with the catalyst becomes more unfavorable for sustained dehydrogenation than the feed stock itself. For example, in the simple case of a feed stock containing 90 per cent isobutane and 10 per cent normal butane, the productivity of the catalyst is decreased by much more than the 31 per cent indicated by Figure 1 for this composition, because a recycle stock will contain more normal butane than the feed stock and thus the normal butane in the paraffin material in contact with the catalyst increases to more than 10 per cent. Furthermore, since the enriching of the recycle stock with the relatively refractory component proceeds cumulatively, the composition of the material in contact with the catalyst becomes progressively more and more unfavorable for sustained dehydrogenation, until a steady state is reached. For this reason, the running life, instead of being 18 hours, as indicated by Figure 1 for a feed stock containing 90 per cent isobutane and 10 per cent normal butane, may be decreased, in the extreme, to only about 8 hours, whereupon the total loss of productivity is equivalent to 18 hours, which is 69 per cent of the expected life of 26 hours.

The cumulative enriching of the recycle stock with components relatively difficult to dehydrogenate leads to a further defect in the prior art in that it causes a corresponding progressive change in the character and composition of the product, from the start of the catalytic dehydrogenation process until the final steady state is reached. Thus, in the dehydrogenation of a four-carbon petroleum cut predominating in isobutane, the olefin product initially consists principally of isobutene; but, as the recycle stock cumulatively becomes enriched with normal butane, the proportion of isobutene in the product correspondingly decreases. This change is obviously undesirable from the point of view of obtaining a product of high uniformity throughout the operation of the process. A dehydrogenation product not highly uniform in character and composition at times cannot be utilized to the best advantage in subsequent manufacturing steps. For example, in the manufacture of motor fuel of high antiknock value by interpolymerization, or copolymerization, of isobutene and normal butenes, such as that disclosed by Frey in his application Serial No. 294,377, filed September 11, 1939, it is sometimes highly desirable to maintain a constant ratio of isobutene to normal butenes in the feed stock in order to obtain a motor fuel of continuously high uniformity of composition and of antiknock quality.

It is among the objects of my invention to overcome the hereinbefore described defects in the prior art. One object is to decrease the disadvantageous decrease in catalytic activity or productivity in the dehydrogenation of mixtures of two or more hydrocarbons. Another object is to obtain continuously a highly uniform product in the catalytic dehydrogenation of a mixture of paraffin hydrocarbons. Other objects and advantages will be obvious to those skilled in the art.

As one modification my invention comprises, in combination, separating a mixture of two or more paraffin hydrocarbons into fractions differentiated by some difference in properties, such as for example, a difference in the carbon-skeleton structure of the hydrocarbon molecules, by any suitable separation means, as by fractional distillation in the absence or in the presence of added substances, fractional condensation, fractional crystallization, fractional dissolution, fractional centrifugation, fractional absorption, fractional adsorption, or the like; subsequently subjecting the fractions separately to a catalytic dehydrogenation that converts the paraffins to olefins; and mixing the resultant olefins, advantageously after separation from unreacted paraffins, in substantially the same proportions as those that existed for the corresponding paraffins in the original mixture. In a more specific modification of my invention it comprises the foregoing steps in which the dehydrogenations are carried out under constant-conversion conditions and more specifically with equal extents of conversion in each dehydrogenation step.

The invention will be readily understood from the following description and the accompanying drawing.

Figure 2:
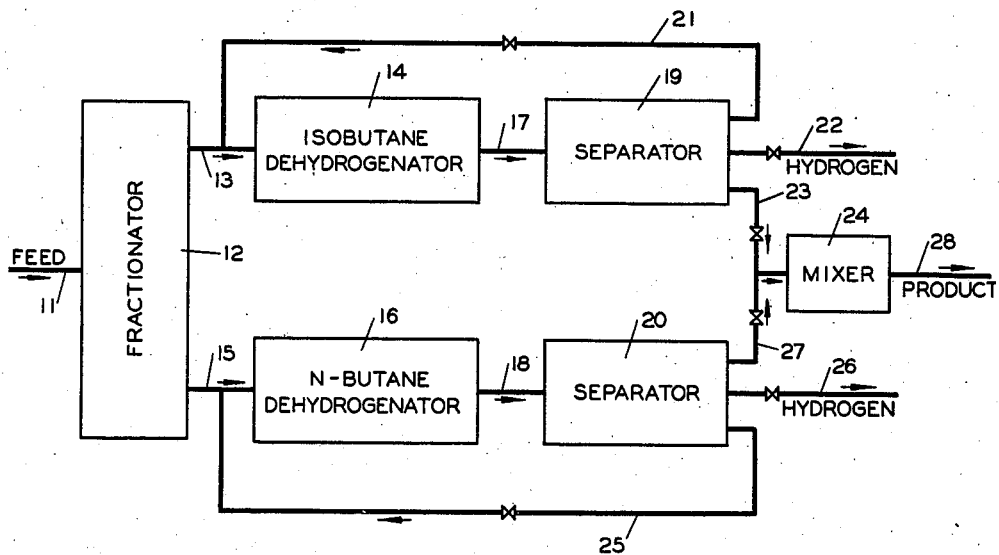

Figure 2 is a flow diagram illustrating one specific embodiment or mode of operation of my invention for the production of olefins by the dehydrogenation of a mixture of two paraffins; for purely illustrative purposes, the paraffins may be taken to be isobutane and normal butane. A feed stock consisting chiefly of these two paraffin hydrocarbons is fed through conduit 11 into fractionator 12, wherein it is fractionated into substantially pure isobutane passing therefrom by conduit 13 into catalytic dehydrogenator 14, and into substantially pure normal butane passing therefrom by conduit 15 into catalytic dehydrogenator 16. Each dehydrogenator is operated to produce a constant amount of dehydrogenation to olefins over an extended period of time, also so that the same degree or percentage of dehydrogenation is effected in one as in the other. From dehydrogenators 14 and 16 the mixtures of products of dehydrogenation and of unreacted hydrocarbons pass by conduits 17 and 18 into separators 19 and 20, respectively. In separator 19, separation may be effected into substantially pure isobutane, which is recycled to dehydrogenator 14 by valved conduit 21; into hydrogen, which may be accompanied by light-hydrocarbon by-products and which is withdrawn through valved exit 22; and into a stream comprising isobutene, which proceeds by valved conduit 23 to mixer 24. Similarly, in separator 20, separation is effected into substantially pure normal butane, which is recycled to dehydrogenator 16 by valved conduit 25; into hydrogen, which may be accompanied by light-hydrocarbon by-products and which is withdrawn through valved exit 26; and into a stream comprising normal butenes, which proceeds by valved conduit 27 to mixer 24. In mixer 24 the isobutene and normal butene fractions are mixed, preferably in substantially the same proportions as those characteristic for the corresponding paraffin hydrocarbons in the original feed stock, and the resultant mixed-olefin product proceeds by conduit 28 to subsequent manufacturing steps, to storage, or to any other desired operations.

Similar modes of operation of my invention may be used advantageously for the catalytic dehydrogenation of many other mixtures of two or more paraffin hydrocarbons, such as hydrocarbons having from two to five carbon atoms per molecule, especially hydrocarbons having four or five carbon atoms per molecule. Examples of such mixtures are ethane and propane, propane and one or both butanes, isopentane and normal pentane, and the like. For example, a petroleum cut containing chiefly isopentane and normal pentane may be fractionated into substantially pure isopentane and substantially pure normal pentane, the two fractions may be dehydrogenated separately by a dehydrogenation catalyst, and the resulting dehydrogenated hydrocarbons may be mixed to form the desired product. In some cases, in which more than two paraffins are involved, after the initial separation of the paraffins, fractions of substantially identical deactivating behavior upon the dehydrogenation catalyst may be combined to effect a decrease in the number of fractions; for example, in the dehydrogenation of a petroleum cut consisting chiefly of isobutane, normal butane, isopentane, and normal pentane, the fractionation of the mixture into the four components may be followed by a mixing of the isobutane and the isopentane into an isoparaffin fraction and of the normal butane and the normal pentane into a normal paraffin fraction. Such fractions will be considered to consist of hydrocarbons of the same hydrocarbon species within the spirit of the present specification, as well as when the fraction consists of only one hydrocarbon, such as isobutane. After the resultant two composite fractions are separately dehydrogenated over a dehydrogenation catalyst, the olefins obtained are mixed to form the desired product. A paraffinic gasoline of low octane number may be treated to improve its octane number in a similar manner, by being fractionated into two or more fractions which are separately dehydrogenated in accordance with the invention, and subsequently recombined.

In a preferred mode of operation of my invention, the various catalytic dehydrogenators are so adjusted in catalyst content, in accordance with the deactivating characteristics of the fractions treated therein, that, with the temperature in each dehydrogenator so controlled that the concurrent conversions are substantially constant and equal in all, the lengths of running life, up to the point at which the various portions of catalyst require revivification, are substantially the same for all. In such a mode of operation to produce olefins from paraffins the ratio of the amount of the olefin coming from any particular dehydrogenator to the total amount of olefins coming from all the dehydrogenators is substantially the same as the ratio of the amount of the paraffin entering that particular dehydrogenator to the total amount of paraffins entering all the dehydrogenators. This fact is of considerable advantage, for continuous mixing of the entire olefin products from all the dehydrogenators results in the continuous formation of a uniform olefin mixture without the use of storage facilities, which would be necessary if the rates of formation of the individual olefins were not balanced relatively to one another.

In this mode of operation, the optimum relative amounts of catalyst in the various dehydrogenators may be determined most exactly by trial; but they may be determined to a degree of exactness adequate for practical purposes by calculations based on data obtained with substantially pure individual hydrocarbons. For example, for a catalyst of substantially the same characteristics as those of the catalyst used in the runs whose results are depicted in Figure 1 and for an equimolecular mixture of isobutane and normal butane, the amount of catalyst to be used in the isobutane dehydrogenator, such as dehydrogenator 14 of Figure 2, may be 11/(11+27), or 29 per cent, of the total amount of catalyst in both dehydrogenators; and that to be used in the normal butane dehydrogenator will be 27/(11+27), or 71 per cent, of the total amount. Similarly, for the same catalyst but for a mixture containing 90 per cent isobutane and 10 per cent normal butane, the catalyst in the isobutane dehydrogenator would be relatively 9 times as much as for an equimolecular mixture; thus, of a total quantity of 1000 pounds of catalyst, the amount to be used in the isobutane dehydrogenator would be 1000(9×29)/(71+(9×29))=786 pounds, and that in the normal butane dehydrogenator would be 1000(71)/(71+(9×29))=214 pounds.

In general, in this mode of operation, for an initial butane mixture containing before separation P per cent normal butane and (100−P) per cent isobutane, the catalyst to be used in the isobutane dehydrogenator may be $$11(100-P)/(1100+16P)$$

of the total amount of catalyst used in both dehydrogenators; and that to be used in the normal butane dehydrogenator will be $$27P/(1100+16P)$$

of the total. These expressions have been derived for mixtures of the two butanes and for chromium oxide catalysts of the same characteristics as those possessed by the catalyst used for obtaining the data of Figure 1, but they are also more or less valid for all other hydrocarbon-dehydrogenating catalysts. More general expressions that are practically valuable and useful for any dehydrogenation catalyst and for any mixture of two paraffin hydrocarbons A and B, especially for mixtures of two paraffin hydrocarbons of the same number of carbon atoms, are $P_AR/(P_AR+P_B)$ and $P_B/(P_AR+P_B)$ for the fraction of the total catalyst to be used in the A dehydrogenator and for the fraction of the total catalyst to be used in the B dehydrogenator, respectively, where $P_A$ and $P_B$ are the percentage of A and of B, respectively, in the feed stock, and R is the ratio of the length of running life of a definite quantity of the catalyst in the dehydrogenation of B to its length of running life in the dehydrogenation of A under identical conditions of extent of conversion and time of contact with the catalyst. These expressions also are more or less generally valid for practical applications in which A and B are not pure individual hydrocarbons but are fractions obtained by fractionating the paraffin feed stock. For example, in the case of certain petroleum cuts, fraction A may consist substantially entirely of hydrocarbons of branched carbon-skeleton structure, and fraction B may consist substantially entirely of hydrocarbons of straight-chain or normal carbon-skeleton structure, or one or more of the hydrocarbon fractions may be predominantly paraffinic and one or more predominantly naphthenic, as when a natural gasoline or a straight-run gasoline stock is being treated to improve its antiknock characteristics.

It is sometimes advantageous to operate at the same space velocity in each of the various dehydrogenators. In such operations, the entire portions of catalyst apportioned to the dehydrogenators advantageously are not placed into use at once; instead, the amount in use in any particular dehydrogenator at any one time is made proportional to the relative size of the fraction being dehydrogenated therein, and the catalyst is replaced, as it becomes deactivated, until the entire portion apportioned to that particular dehydrogenator is used up. If desired, in this manner of operation, the catalyst apportioned to a dehydrogenator advantageously may be fed intermittently or continuously through the dehydrogenator, as from a suitable hopper or by means of a catalyst-containing or catalyst-propelling device, such as a series of perforated baskets, a worm screw, or the like. In general, the portions of catalyst become completely used up and fully deactivated at approximately the same moment for all the dehydrogenators, and the overall dehydrogenation of the original hydrocarbon mixture is the maximum for the total amount of catalyst used.

After the dehydrogenation, the resultant olefins may be separated, advantageously before being mixed together, from the unreacted paraffins by any suitable fractionation or separation means. Of the various known fractionation means, some are usually more advantageous than others for the separation of a particular olefin from the corresponding paraffin, but a suitable fractionation means may be readily found by trial. For the separation of hydrocarbons having less than four carbon atoms per molecule, I generally prefer to use fractional distillation; and for the separation of hydrocarbon having four or five carbon atoms per molecule, I prefer to use fractional distillation in the presence of an added substance that forms a binary minimum boiling azeotropic mixture with each of the hydrocarbons, the paraffin azeotropes having higher vapor pressures than the olefin azeotropes. Suitable added substances are polar oxygen-containing compounds, such as sulfur dioxide, ethylene oxide, and methyl formate; the use of these compounds for the separation of olefins from paraffins is described in the patent of Frey, Matuszak and Snow, 2,186,524.

After such separation, the olefins are mixed to form an olefin mixture in which the olefins are present in substantially the same relative concentrations as those of the corresponding paraffins in the original paraffin mixture.

By practice of my invention, a given body of catalyst may dehydrogenate a mixture of paraffin hydrocarbons for the period that is to be expected from the length of the running life for each of the hydrocarbons taken individually. For example, the chromium oxide gel catalyst of the foregoing specific illustrative example may dehydrogenate an equimolecular mixture of normal butane and isobutane for a total period of 19 hours instead of the period of only 8 hours that was hitherto obtainable, provided that the two hydrocarbons are fractionated apart and then are dehydrogenated separately. If desired, one and the same catalytic dehydrogenator may be used to dehydrogenate both the normal butane and the isobutane, but only one of them at a time and not simultaneously; in such a modification, the isobutane advantageously is dehydrogenated first, as the catalyst appears to be deactivated less readily by it than by normal butane. Similarly, many other modifications may be made that will be obvious to those skilled in the art.

Although my invention has been described chiefly for the dehydrogenation of hydrocarbon mixtures containing two components, it is not limited to such mixtures but may be used for the dehydrogenation of mixtures of any number of components whatsoever, as the principles I have discovered are generally valid and may be extended and used for complex mixtures, with the modifications necessary for any particular case which may be readily ascertained and applied with the benefit of the teachings of the present disclosure. The components of such mixtures may be separated into fractions of the same or a smaller number than the number of components; then the fractions may be dehydrogenated, individually, or after certain ones have been combined within permissible limits for the case in hand; and finally the resultant unsaturates may be mixed together. The number of dehydrogenators preferably may be made the same as the number of fractions, simple or composite, that are to be dehydrogenated; and a given body of catalyst may be divided among the various dehydrogenators proportionately to the deactivating ability of the fractions being dehydrogenated therein.

It may be emphasized that the improved process of my invention achieves a new result unexpected and hitherto unobtained by the prior art relating to the catalytic dehydrogenation of mixtures containing at least two paraffin hydrocarbons; namely, extension of the running life of the dehydrogenation catalyst by avoidance, elimination, or minimization of the hereinbefore described disadvantageous decrease in catalytic activity and productivity, especially when operating under constant conversion conditions. By running life is meant a period of use of the catalyst wherein the catalyst maintains a desirably high degree of activity, said period being generally followed by revivification of the catalyst. Furthermore, my improved process yields as a product a mixture of dehydrogenated hydrocarbons of higher uniformity of composition than has been continuously obtainable hitherto by the practice of the prior art.

It will be understood that well-known equipment, not shown in the drawing in detail, such as pumps, control valves, automatic controls of various kinds and purposes, heaters, coolers, and the like, may be used wherever they are desirable or necessary. The flow and reaction and other conditions have been discussed so as to serve as efficient guides. Furthermore, it will be understood that, within the limits of the appended claims, my invention is extensive in scope and equivalents and is not to be limited unduly by the particular hydrocarbons, temperatures, concentrations, or other details given in the foregoing specification and example.

I claim:

1. The process of catalytically dehydrogenating a hydrocarbon mixture containing at least two paraffin hydrocarbons having at least two carbon atoms per molecule and forming a corresponding olefin mixture which comprises fractionating said mixture into a plurality of separate fractions each consisting substantially of a single paraffin hydrocarbon species, each of said fractions containing substantially only paraffin hydrocarbons of a single molecular weight and species and further containing substantially all of such material present in said mixture, subjecting said fractions separately to catalytic dehydrogenation simultaneously in a corresponding number of catalytic dehydrogenation zones under conditions such as to produce the respective olefins corresponding substantially entirely in number of carbon atoms and in carbon-skeleton to said several paraffin hydrocarbons making up said fractions, separately treating the individual dehydrogenation effluents to recover the resulting olefins contained therein, and mixing said resulting olefins so recovered with one another in substantially the same relative proportions as the corresponding paraffins from which they were derived had in said original mixture.

2. The process of catalytically dehydrogenating a hydrocarbon stream consisting essentially of isobutane and normal butane to a corresponding isobutene-normal butene mixture which comprises fractionating said entire stream into two fractions of substantially pure isobutane and substantially pure normal butane, taking a given quantity of a paraffin-to-olefin dehydrogenation catalyst, apportioning said quantity of catalyst between two separate catalytic dehydrogenators in such a way that $$11(100-P)/(1100+16P)$$

of the catalyst is presented in one dehydrogenator and that $27P/(1100+16P)$ of the catalyst is presented in the other dehydrogenator, where P is the percentage of normal butane in said mixture, and simultaneously and separately passing said isobutane fraction through the dehydrogenator containing $11(100-P)/(1100+16P)$ of said catalyst and said normal butane fraction through the dehydrogenator containing $$27P/(1100+16P)$$

of said catalyst, separately controlling conditions in said dehydrogenators that substantially the same and substantially constant percentage of dehydrogenation is effected continuously and concurrently in said dehydrogenators, separately recovering the isobutene and normal butene content from the respective dehydrogenation effluents, and blending said isobutene and normal butene in substantially the same proportions as said isobutane and normal butane had in said original stream.

3. The process of catalytically dehydrogenating a hydrocarbon mixture containing at least two paraffin hydrocarbons A and B each having at least two carbon atoms per molecule by means of a given quantity of a paraffin-to-olefin dehydrogenation catalyst, and forming a corresponding olefin mixture which comprises fractionating said mixture into two fractions A and B, each of said fractions consisting essentially of substantially all of said component A or B originally present in said mixture, apportioning said quantity of catalyst between two catalytic dehydrogenators in such a way that $P_AR/(P_AR+P_B)$ of said catalyst is presented in one dehydrogenator and that $P_B/(P_AR+P_B)$ of said catalyst is presented in the other dehydrogenator, where $P_A$ and $P_B$ are the percentages of fractions A and B, respectively, in said mixture and R is the ratio of the length of the running life of a definite quantity of said catalyst in the dehydrogenation of fraction B to the length of its running life in the dehydrogenation of fraction A under identical conditions of extent of conversion and time of contact, simultaneously and separately dehydrogenating fraction A in the dehydrogenator containing $P_AR/(P_AR+P_B)$ of said catalyst and fraction B in the dehydrogenator containing $P_B/(P_AR+P_B)$ of said catalyst, separately controlling the dehydrogenation conditions in such manner that substantially the same and substantially constant percentage of dehydrogenation is effected continuously and concurrently in said dehyrogenators, separately recovering the olefin content of the respective dehydrogenation effluents, and mixing the resulting olefins so produced in substantially the same proportions as the corresponding paraffins had in said original mixture.

4. The process of dehydrogenating a paraffin hydrocarbon mixture containing at least two paraffin hydrocarbons having at least two carbon atoms per molecule and forming a corresponding olefin mixture which comprises fractionating said mixture into a plurality of separate substantially pure fractions, continuously subjecting at a constant rate a first paraffin fraction so separated to catalytic dehydrogenation to the corresponding olefin under such conditions as to effect a substantial and relatively constant extent of conversion over an extended period of time, continuously and concommitantly subjecting at a constant rate a second paraffin fraction so separated to catalytic dehydrogenation to the corresponding olefin under such conditions as to effect a relatively constant conversion to said olefin substantially equal in extent to concurrent conversion of said first fraction, continuously separately recovering from the effluents of each conversion the olefin content thereof and the unconverted paraffin content thereof, recycling said unconverted paraffin content to the respective dehydrogenation step from which they originated, and blending the olefins so recovered with one another to form a single olefin-containing stream in which both the total olefin content and the ratios of individual olefins are substantially constant over an extended period of time and said ratios substantially the same as the corresponding paraffins from which they were derived were present in the original stream.

5. The process of catalytically dehydrogenating a hydrocarbon stream consisting essentially of 100–P per cent isobutane and P percent normal butane to a corresponding isobutene-normal butene mixture which comprises continuously fractionating said stream into fractions of substantially pure isobutane and normal butane, apportioning a quantity of black unglowed chromium oxide catalyst between two catalytic dehydrogenation zones, $11(100-P)/(1100+16P)$ of the total quantity of said catalyst being apportioned to the isobutane dehydrogenation zone and $27P/(1100+16P)$ of the total quantity of said catalyst being apportioned to the normal butane dehydrogenation zone, continuously passing said pure isobutane and butane fractions simultaneously through said respective dehydrogenation zones in parallel, controlling dehydrogenation conditions therein to effect substantially constant and equal extents of concurrent conversion therein and substantially equal lengths of running life therefor, continuously separating the individual effluents from said zones to separately recover the isobutene and normal butenes therefrom and the unreacted isobutane and normal butane therefrom, respectively, and from hydrogen and any lighter hydrocarbon by-products, continuously recycling said unreacted isobutane and normal butane to the respective dehydrogenation zones, and continuously blending all of said isobutene and normal butenes as recovered to form a single olefin stream of uniform composition and containing isobutene and normal butenes in substantially the same proportions as isobutane and normal butane were present in the original stream.

MARYAN P. MATUSZAK.